(12) United States Patent
Osterloh et al.

(10) Patent No.: US 7,376,118 B2
(45) Date of Patent: May 20, 2008

(54) SYSTEM AND METHOD FOR OPTIMIZING CONTIGUOUS CHANNEL OPERATION WITH CELLULAR REUSE

(75) Inventors: Christopher L. Osterloh, Waseca, MN (US); Neil R. Hovelsrud, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 796 days.

(21) Appl. No.: 10/929,862

(22) Filed: Aug. 30, 2004

(65) Prior Publication Data
US 2005/0053047 A1    Mar. 10, 2005

Related U.S. Application Data

(60) Provisional application No. 60/500,504, filed on Sep. 5, 2003.

(51) Int. Cl.
| | |
|---|---|
| G08C 19/16 | (2006.01) |
| G08B 23/00 | (2006.01) |
| H04B 7/00 | (2006.01) |
| H04B 7/208 | (2006.01) |
| H04B 17/00 | (2006.01) |
| H04J 1/00 | (2006.01) |
| H03C 1/62 | (2006.01) |

(52) U.S. Cl. ............ 370/344; 340/870.01; 340/870.02; 370/310; 370/343; 379/90.01; 379/106.01; 379/106.03; 455/115.4; 455/155.1; 455/226.4

(58) Field of Classification Search ...................... None
See application file for complete search history.

(56) References Cited

U.S. PATENT DOCUMENTS

| | | |
|---|---|---|
| 5,073,971 A | 12/1991 | Schaeffer |
| 5,684,472 A | 11/1997 | Bane |
| 6,512,463 B1 | 1/2003 | Campbell et al. |
| 2002/0193144 A1 | 12/2002 | Belski et al. |
| 2003/0048199 A1* | 3/2003 | Zigdon et al. ......... 340/870.02 |
| 2003/0054777 A1* | 3/2003 | Hoctor ....................... 455/108 |
| 2004/0064276 A1* | 4/2004 | Villicana et al. ............... 702/61 |
| 2004/0113757 A1* | 6/2004 | White et al. ........... 340/310.01 |
| 2004/0125889 A1* | 7/2004 | Cumeralto et al. ......... 375/303 |
| 2004/0131125 A1* | 7/2004 | Sanderford ed al. ........ 375/261 |
| 2004/0135676 A1* | 7/2004 | Berkman et al. ...... 340/310.01 |
| 2004/0227621 A1* | 11/2004 | Cope et al. ............ 340/310.01 |
| 2004/0227622 A1* | 11/2004 | Giannini et al. ....... 340/310.01 |

* cited by examiner

*Primary Examiner*—Duc M. Nguyen
*Assistant Examiner*—Matthew Genack
(74) *Attorney, Agent, or Firm*—Patterson, Thuente, Skaar & Christensen, P.A.

(57) ABSTRACT

A method for communicating with automatic meter reading (AMR) endpoints in adjacent cells, when the endpoints are arranged in a cell pattern similar to a cellular telephone system, is disclosed that substantially reduces the likelihood of signal interference. A Frame ID is identified as corresponding to a particular receive frequency that a system reader (receiver/collector) uses when listening for endpoint responses. In this example embodiment of the AMR network model, all endpoints in the network listen on the same control frequency to receive commands sent out from the readers. To allow for a relatively fast network read cycle, cells that are spaced far enough away from each other as to not interfere with each other are allowed to transmit at the same time. Cells with the same Frame ID are configured to be spaced a safe distance from each other so as not to interfere with each other's endpoint population.

29 Claims, 9 Drawing Sheets

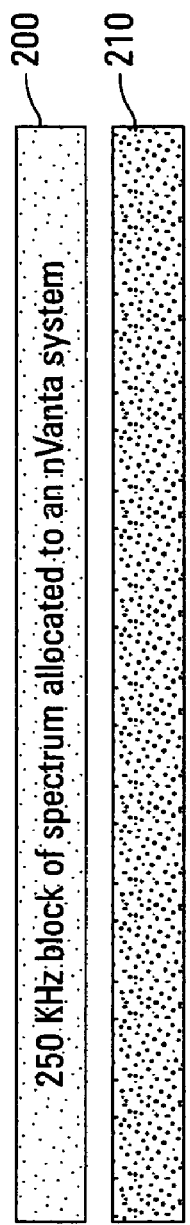
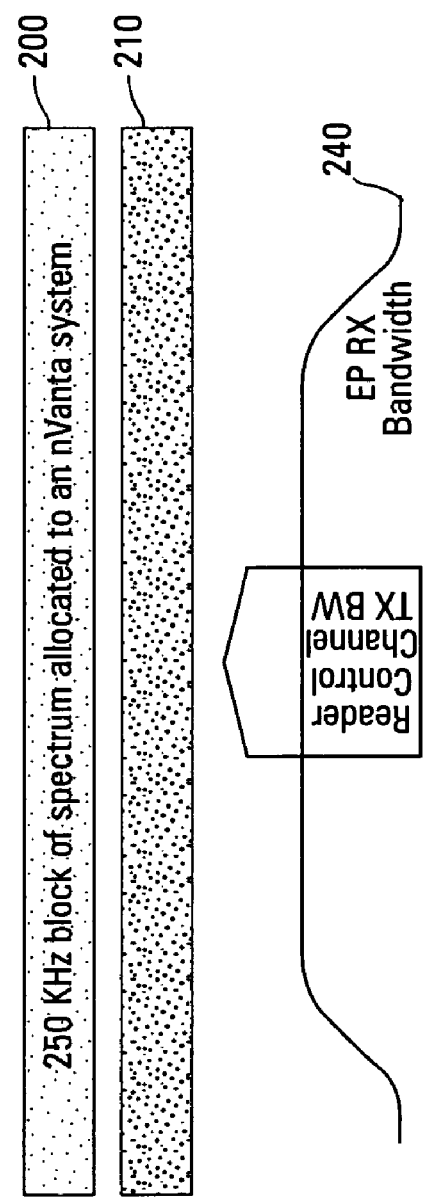

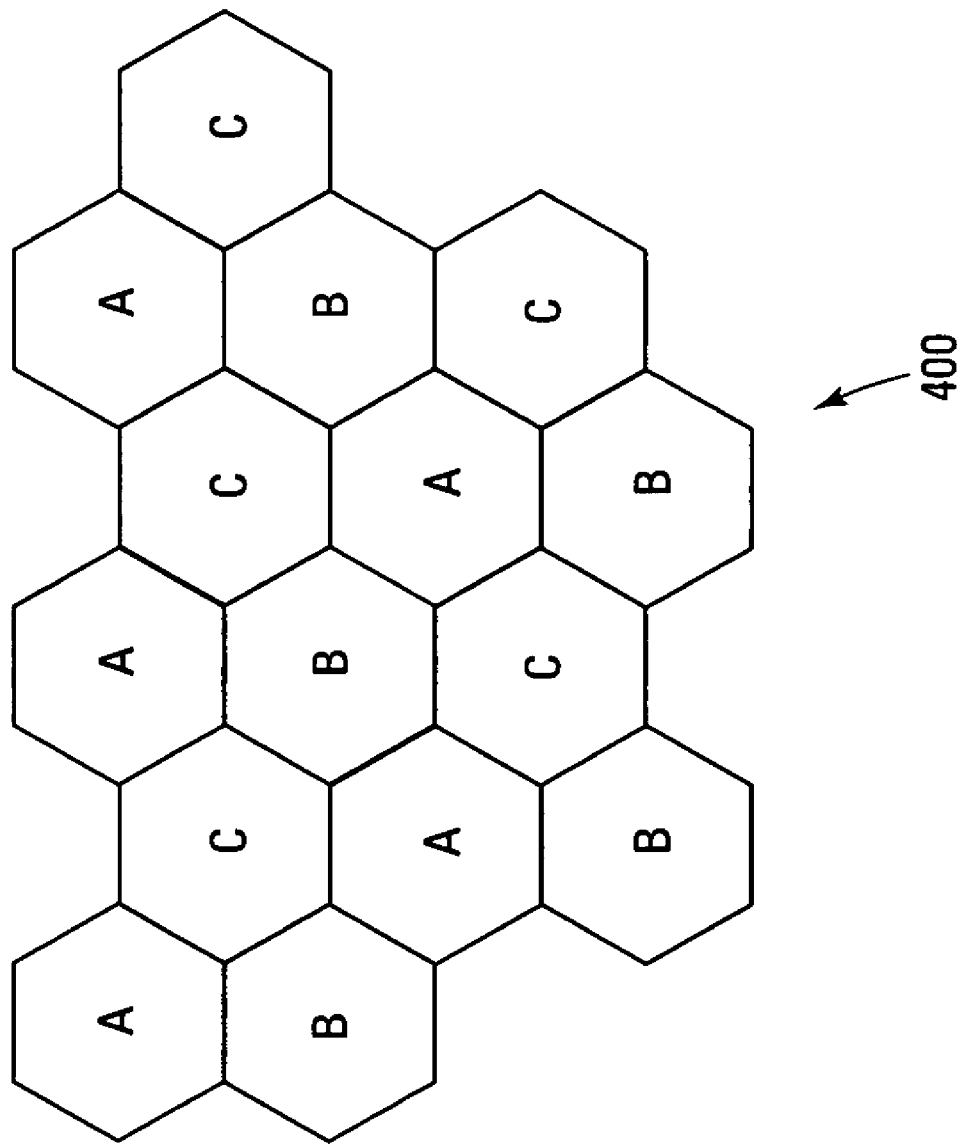
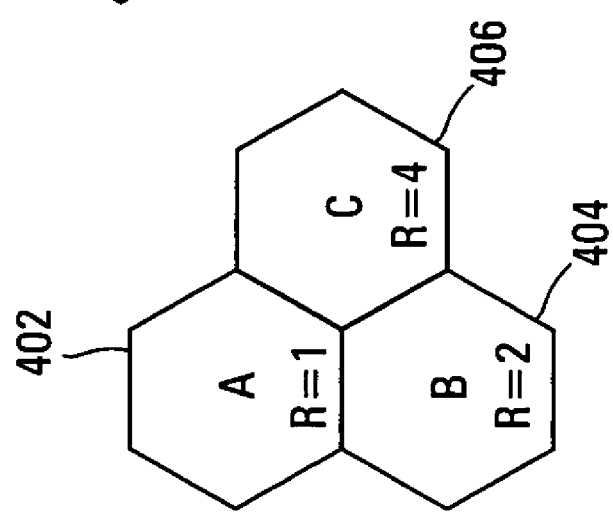
Fig. 4

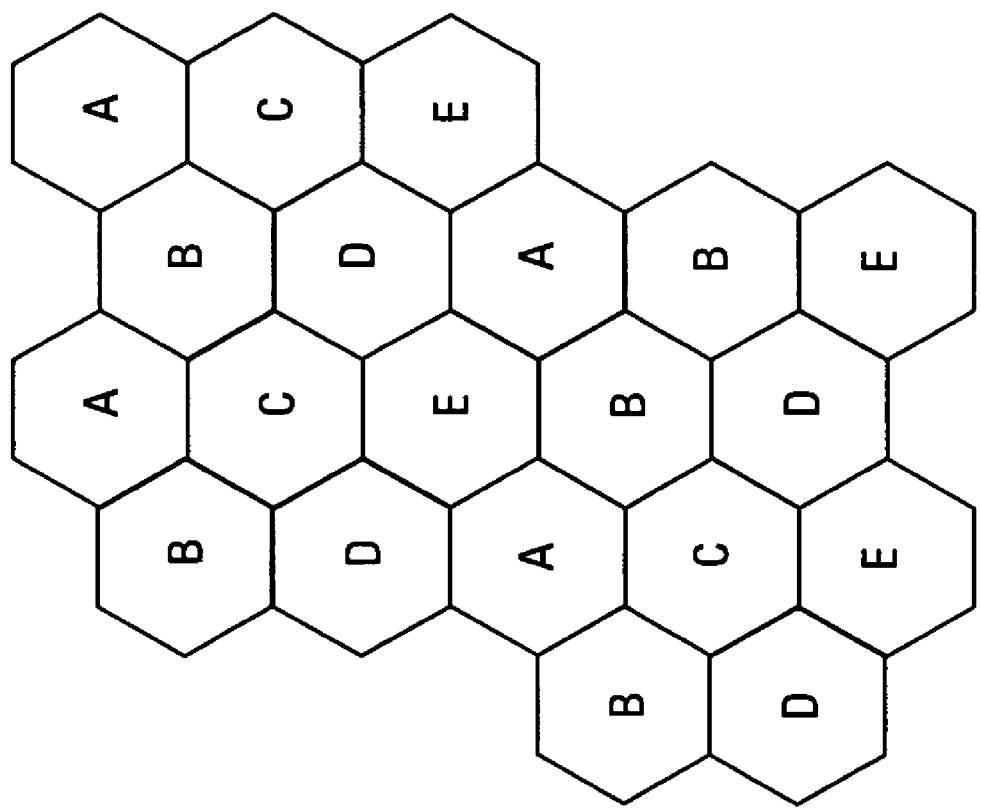
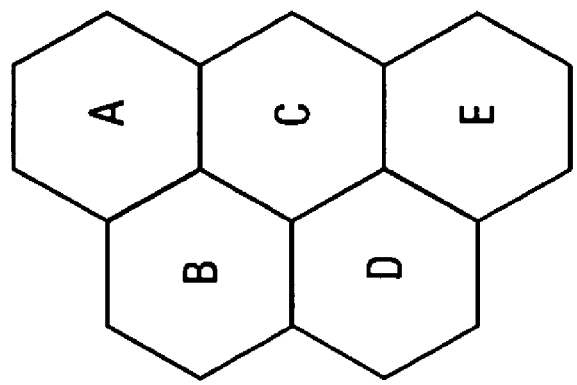
Fig. 5B

SYSTEM AND METHOD FOR OPTIMIZING CONTIGUOUS CHANNEL OPERATION WITH CELLULAR REUSE

PRIOR APPLICATION

This application claims priority to U.S. Provisional Application No. 60/500,504, filed on Sep. 5, 2003, entitled "System and Method for Optimizing Contiguous Channel Operation with Cellular Reuse," which is herein incorporated by reference.

RELATED APPLICATIONS

This application is related to commonly assigned U.S. Patent Application No. 60/500,507, filed on Sep. 5, 2003, entitled "System and Method for Detection of Specific On-Air Data Rate," U.S. Patent Application No. 60/500,515, filed Sep. 5, 2003, entitled "System and Method for Mobile Demand Reset," U.S. Patent Application No. 60/500,479, filed Sep. 5, 2003, entitled "Synchronous Data Recovery System," U.S. Patent Application No. 60/500,550, filed Sep. 5, 2003, entitled "Data Communication Protocol in an Automatic Meter Reading System," U.S. patent application Ser. No. 10/570,779, filed on Sep. 5, 2003, entitled "Synchronizing and Controlling Software Downloads, such as for Components of a Utility Meter-Reading System," U.S. patent application Ser. No. 10/571,043, filed on Sep. 5, 2003, entitled "Field Data Collection and Processing System, such as for Electric, Gas, and Water Utility Data," which are herein incorporated by reference.

FIELD OF THE INVENTION

The present invention relates to a method and system for collecting data from remote utility meters and, more particularly, to method and a system for improving coverage of an automated meter reading system without substantially increasing the cost of the overall system.

BACKGROUND OF THE INVENTION

Wireless automatic meter reading systems are well known. Typically, each utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless meter reading systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of end point encoder transmitters that must be deployed as part of a utility meter reading system for a large metropolitan area. In a related mode, the remote meter encoders are read via handheld reader/programmers vans that contain RF reading equipment.

Since a number of these devices operate on batteries, preserving battery life is one of the main concerns. By way of example, a battery operated RF encoder used to read gas utility meters typically goes to "sleep" between reads in order to conserve battery power. When a van passes through the area, it sends out a "wake-up" signal that causes the Encoder/Receiver/Transmitters (i.e., the endpoints) in the area to respond by transmitting encoded signals containing the metering data and any stored tamper signals. While at short distances it is possible to establish two-way RF communications with the automatic meter reading (AMR) system using a van or handheld devices, it would be more efficient to configure these fixed AMR systems into full two-way RF communication systems that remotely transmit the data to the central office of a utility company (such as through a network of concentrators located throughout the AMR system).

Complicating factors to reaching a goal of full two-way communication include: the great number and variety of devices that exist in the field (gas, water, electric) that have to communicate back to the central office; the different utilities that have to communicate with their respective devices within the different geographical locations and the types of data being requested; and interference and collisions caused by several reading devices communicating their data back to the central office. The increase in density of devices in relation to the geographic area and the need for simultaneous communication begin to approximate the issues already being faced by telecommunication companies with their cellular communication networks. Similarly, some fixed AMR systems are being geographically configured to simulate cellular communication systems in that they are comprised of different cells that transmit their data and communicate primarily over a single frequency channel.

Due to the number of transactions per cell, which is comparable to the number of utility meters in an AMR system, and due to the time it takes for a request/answer transaction to be processed, each concentrator will keep its RF frequency ("channel") busy for a period of time during which no other relatively close cells can use the same RF channel (thereby avoiding co-channel interference or collisions). Thus, when using the fixed network schemes of the prior art on a single channel, there are limitations as to the number of cells which could be read on any given day. Therefore, in certain geographical areas it is difficult to meet the requirements of simply performing the basic AMR operation in a reasonable amount of time.

One approach is to assign different frequencies to the different devices or to the different cells in the AMR system. However, this is only a short-term solution as the number of available frequency bands is inadequate to handle the increasing number of endpoint units that will be placed in a defined geographic location. Increasing the number of endpoints in the AMR system requires more efficient utilization of the limited available frequency spectrum in order to provide more total channels while maintaining communications quality. This is even more of a challenge where the endpoints are not uniformly distributed among cells in the system. More channels may be needed for particular cells to handle potentially higher local endpoint densities at any given time. For example, a cell in an urban area will include more endpoints requiring reading then a cell in a rural area.

For many of these same reasons, conventional cellular systems utilize frequency reuse to increase potential channel capacity in each cell and increase spectral efficiency. Frequency reuse involves allocating a frequency to each cell, with cells utilizing the same frequencies geographically separated to allow cellular phones in different cells to simultaneously use the same frequency without interfering with each other. By so doing, many thousands of subscribers may be served by a system providing only several hundred frequencies. One of the drawbacks to using frequency or cellular reuse in AMR systems is the limited number of available frequency bands.

Accordingly, there is a need for a system for collecting data from meter modules located in a wide area that has a high degree of accuracy and reliability without substantially increasing the costs of the AMR network. An approach that addresses the aforementioned problems, as well as other related problems, is therefore desirable.

SUMMARY OF THE INVENTION

The present invention is generally directed to a method and a system for reducing the incidence of RF signal collision or interference in collecting data from remotely located meter modules via a fixed or a mobile data collection system. Various embodiments of the invention are directed to addressing various needs in connection with co-channel interference and collision avoidance in data transmissions involving a single frequency in an automatic wireless meter reading system.

According to one aspect of the invention, there is disclosed a method for communicating with endpoints in adjacent cells when the endpoints are arranged in a cell pattern similar to a cellular telephone system. The method identifies a Frame ID as corresponding to a particular receive frequency that a system reader (receiver/collector) uses when listening for endpoint responses. In this example embodiment of the AMR network model, all endpoints in the network listen on the same control frequency to receive commands sent out from the readers. To allow for a relatively fast network read cycle, cells that are spaced far enough away from each other as to not interfere with each other are allowed to transmit at the same time. Cells with the same Frame ID are configured to be spaced a safe distance from each other so as not to interfere with each other's endpoint population.

According to one embodiment of the invention, a method and system are provided for reducing signal interference in the transmission of metered data from a plurality of meter endpoint transmitters to a plurality of corresponding readers in an automatic meter reading (AMR) system. The AMR system includes a first set of the endpoint transmitters being assigned to a first reader, a second set of the endpoint transmitters being assigned to a second reader, and a third set of the endpoint transmitters (endpoints) being assigned to a third reader. The first, second and third set of endpoints are disposed within each of a first, second and third cells that are adjacent to each other. The first step is to assign a first Frame ID number and first response frequency channel to the first reader, a second Frame ID number and a second response frequency channel to the second reader and a third Frame ID number and third response frequency channel to the third reader. The next step is for the first reader to transmit on at least one control frequency channel from a first wake up signal sequence comprised of a wake-up countdown timer frame, a sync and control frame corresponding to the first Frame ID number, and a dead time slot frame, the first wake up signal sequence adapted to include a response delay for the first endpoint set. Similarly, the second reader transmits on the at least one control frequency channel from a second wake up signal sequence comprised of a second wake-up countdown timer frame, a second sync and control frame corresponding to the second Frame ID number, and a second dead time slot frame, the second wake up signal sequence adapted to include a second response delay for the second endpoint set. In addition, the third reader, transmits on the at least one control frequency channel a third wake up signal sequence comprised of a third wake-up countdown timer frame, a third sync and control frame corresponding to the third Frame ID number, and a third dead time slot frame, the third wake up signal sequence adapted to include a third response delay for the third endpoint set. The readers then receive metered data simultaneously from the corresponding endpoint sets via the first, second and third response frequency channels. The order of transmitting the first, second and third wake-up signal sequences and the magnitude of the response delay for the respective endpoints is a function of the Frame ID number that is assigned to each cell.

In a related embodiment, before the step of assigning the Frame ID numbers to the readers, a multi-cell pattern greater than two is selected for positioning all of the endpoint sets in the selected cell pattern. A set of Frame ID numbers and an equal number of response frequencies to be assigned to the readers located within each cell of the selected multi-cell pattern is then generated. In addition, before the step of transmitting the wake-up signal sequences on the control frequency, the first, second and third readers are synchronized so as to alleviate cell-to-cell interference by inserting each of respective the dead slot time frames in each of the wake-up signal sequences immediately after the respective control frame.

According to another embodiment of the invention, an automatic meter reading (AMR) system is configured to transmit metered data gathered by a plurality of endpoint transmitters (endpoints) to a utility via a plurality of designated readers without a substantial loss of data caused by signal interference. The AMR system includes a first set of endpoints assigned to a first reader located within a first cell of a defined communications cell pattern, the first reader having assigned thereto a first Frame ID number and first response frequency channel. In addition, a second set of endpoints assigned to a second reader located within a second cell of the cell pattern, the second reader having assigned thereto a second Frame ID number and a second response frequency channel. Further, a third set of endpoints assigned to a third reader located within a third cell of the cell pattern, wherein the first, second and third cell are disposed adjacent one another, the third reader having assigned thereto a third Frame ID number and third response frequency channel. In the AMR system, the first reader is configured to transmit a first wake up signal sequence on at least one control frequency channel to the first set of endpoints, the second reader is configured to transmit a second wake up signal sequence on the at least one control frequency channel to the second set of endpoints and the third reader is configured to transmit a third wake up signal sequence on the at least one control frequency channel to the third set of endpoints, wherein each wake-up signal sequences is comprised of a wake-up countdown timer frame, a sync and control frame corresponding to one of the first, second or third Frame ID numbers, and a dead time slot frame. The first, second and third wake-up signal sequences are transmitted from the respective readers in a time staggered scheme as a function of the Frame ID number and the first, second and third endpoint sets respond simultaneously to each of the readers via their assigned response frequency, the Frame ID numbers and the response frequencies being a function of a multi-cell pattern selected for organizing all of the endpoint sets.

BRIEF DESCRIPTION OF THE DRAWINGS

The invention may be more completely understood in consideration of the following detailed description of various embodiments of the invention in connection with the accompanying drawings, in which:

FIG. 2A illustrates a 250 KHz frequency spectrum allocated to an RF communication system with a five-channel segmentation of the spectrum according to one example embodiment of the present invention.

FIG. 2B illustrates a control channel of an RF reader and a wide bandwidth of an endpoint module according to an example embodiment of the present invention.

FIG. 4 is illustrates a three-cell frequency reuse pattern for an AMR system configured according to the present invention.

FIGS. 5A and 5B illustrate a four-cell and a five-cell frequency reuse pattern, respectively, for an AMR system configured according to the present invention.

Figure 1:
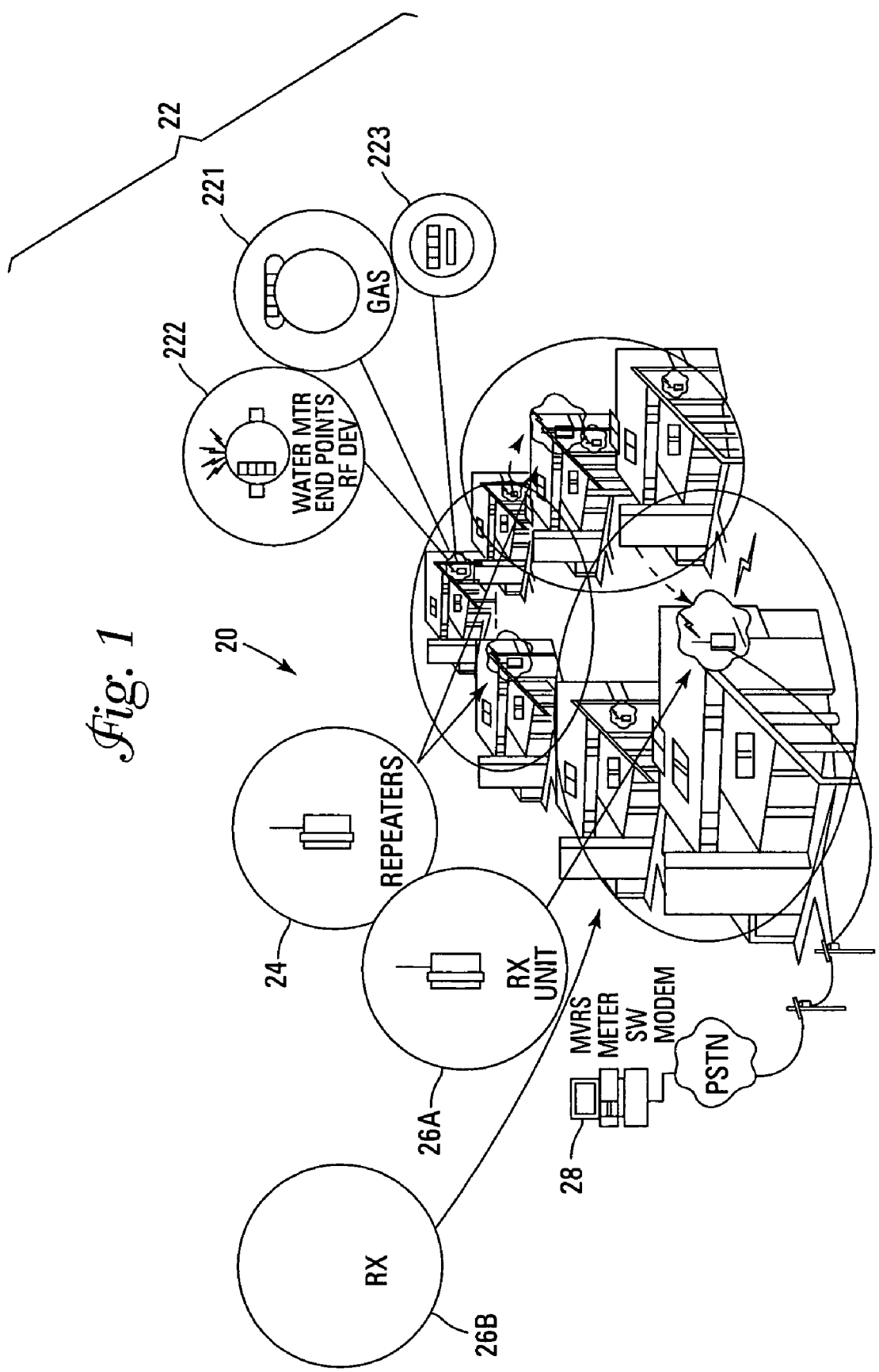
FIG. 1 is a diagram of a radio frequency (RF) data communications system used in connection with a utility metering system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF PREFERRED EMBODIMENTS

The invention is generally directed to a method and a system for reducing the incidence of RF signal collision or interference in collecting data from remotely located meter modules via a fixed or a mobile data collection system. While the invention is not necessarily limited to such an application, the invention will be better appreciated using a discussion of example embodiments in such a specific context.

Referring to FIG. 1, the RF communications method of the invention is incorporated into a utility metering system 20 that monitors and retains data on a plurality of water, electric, and gas utility meters, the meters typically being located in various locations including single-family homes, multi-dwelling and high-rise developments. Utility metering system 20 generally comprises a plurality of meter endpoint encoder transmitter devices, or endpoint modules 22, that include gas endpoint modules 221, water endpoint modules 222 and electric endpoint modules 223. System 20 further comprises one or more repeaters 24, one or more receiver units 26A and 26B, and a head-end, software-driven, meter reading analysis device 28 (or other data analysis tool or device). Receiver units 26 include narrowband receivers, wideband receivers and channel receivers.

In this example embodiment, endpoint modules 22 are preferably radio frequency (RF) transmitter devices that gather and encode utility (gas, electric or water) consumption and tamper information. The modules then transmit this data with other information via RF to base units or channel receivers 26 using a cellular reuse communication technique disclosed herein that avoids collision, loss of data, and depletion of the number of available communication frequencies. In a typical arrangement, the channel receivers are configured to receive data messages or signals at a predetermined frequency from the endpoint modules. Electric endpoint modules 223 are preferably installed under the glass of standard meters so as not to require battery power, while modules 221 and 222, for gas and water respectively, are preferably self-contained, low power units that are powered by long-life batteries. Traditionally, battery powered modules 221 and 222 utilize a very slow "bubble up" rate to extend the life of the batteries by minimizing power consumption and to minimize unnecessary RF interference to other users in the RF band.

Narrowband receivers 26A and 26B are each equipped to transmit the utility data to the meter-reading analysis device 28. The transmission from receivers 26A and 26B is preferably performed via a standard telephone connection (PSTN) 30 or, alternatively, via a cellular connection. Receivers 26A and 26B are preferably mounted at a central point in multi-dwelling complex wherein ease of interconnection to power and telephone lines are available. In a preferred embodiment, each of the receivers 26A and 26B can monitor and retain data on up to 10000 endpoint modules 22. Meter reading analysis device 28 operates to process the usage data that is sent by receivers, such as receivers 26A and 26B, and preferably comprises a standard PC capable of not only processing the data received from the receivers but also providing an interactive, graphical user interface to allow users to extract and report key information. In one application, the software run by meter reading analysis device is preferably Itron's MV-RS Meter Reading Software.

Further details regarding installation and mounting of the general components of system 20 may be found in the Itron "Installation Guide for the PETRC and endpoint Repeater Units used in the PETNET Submetering System", Feb. 20, 2001, and in U.S. Publication No. 2002/0109607A1, "Spread Spectrum Meter Reading System Utilizing Low-Speed/High-Power Frequency Hopping," published Aug. 15, 2002, which are hereby incorporated by reference.

In addition further details on a network and system for communication between meters and readers and the central utility are described in U.S. Publication No. 2002/0158774A1, "Radio Communication Network for Collecting Data From Utility Meters," published Oct. 31, 2002, and in U.S. Publication No. 2003/0001754A1, "Wide Area Communications Network for Remote Data Generating Stations," published Jan. 2, 2003, which are hereby incorporated by reference.

In this example embodiment, endpoint modules 22 are fully synthesized FM transmitters that operate in the 1430 MHz frequency band and are capable of utilizing five or more channels. In one embodiment, endpoint modules of the invention are configured primarily for two-way communication in the same frequency band using a frame-timing scheme. In a related embodiment, the endpoint modules respond on different frequencies but the timing will be adjusted as needed. Appendix A describes the details of several embodiments incorporating the communication scheme to be described herein. Although Appendix A describes various examples of one and two-way communication schemes at varying frequencies, the teachings of the present invention are not necessarily limited to such frequencies and frame-timing patterns.

Generally, the invention is configured as a two-way RF communication system that operates at 1430 MHz (but not necessarily limited to that frequency) and is designed to operate most efficiently in 5 contiguous RF channels. This facilitates the use of a more inexpensive, wide bandwidth receiver section in the endpoint while still maintaining the FCC mandated 50 KHz maximum transmit spectrum.

Referring now to FIGS. 2A and 2B, a 250 KHz frequency spectrum 200 is allocated to an RF communication portion of an AMR system. A five-channel segmentation 210 of the frequency spectrum is comprised of 50 KHz channels numbered accordingly (e.g., 1, 2, 3, 4 and 5). According to FCC guidelines, the transmit section in all devices, endpoints and readers, must maintain a 50 KHz or less occupied bandwidth during transmissions. The receiver in the reader must also have good selectivity on the channel of interest. Conversely, the endpoint module's receiver section has a wider receive bandwidth, as illustrated in FIG. 2B, which helps to reduce the cost of the endpoint module.

FIG. 2B illustrates a control channel 220, designated as center channel 3, of an RF reader and a wide bandwidth 240 of an endpoint module according to an example embodiment of the invention. In this example embodiment, all endpoints listen on this channel as the designated control channel for the AMR system. If the readers are quasi-synchronized in their outbound transmissions this approach allows the endpoints to use a wider receive bandwidth while avoiding interference in the inbound signal from the reader that would normally be a problem. FIG. 2B graphically illustrates these bandwidth differences.

Figure 3A:
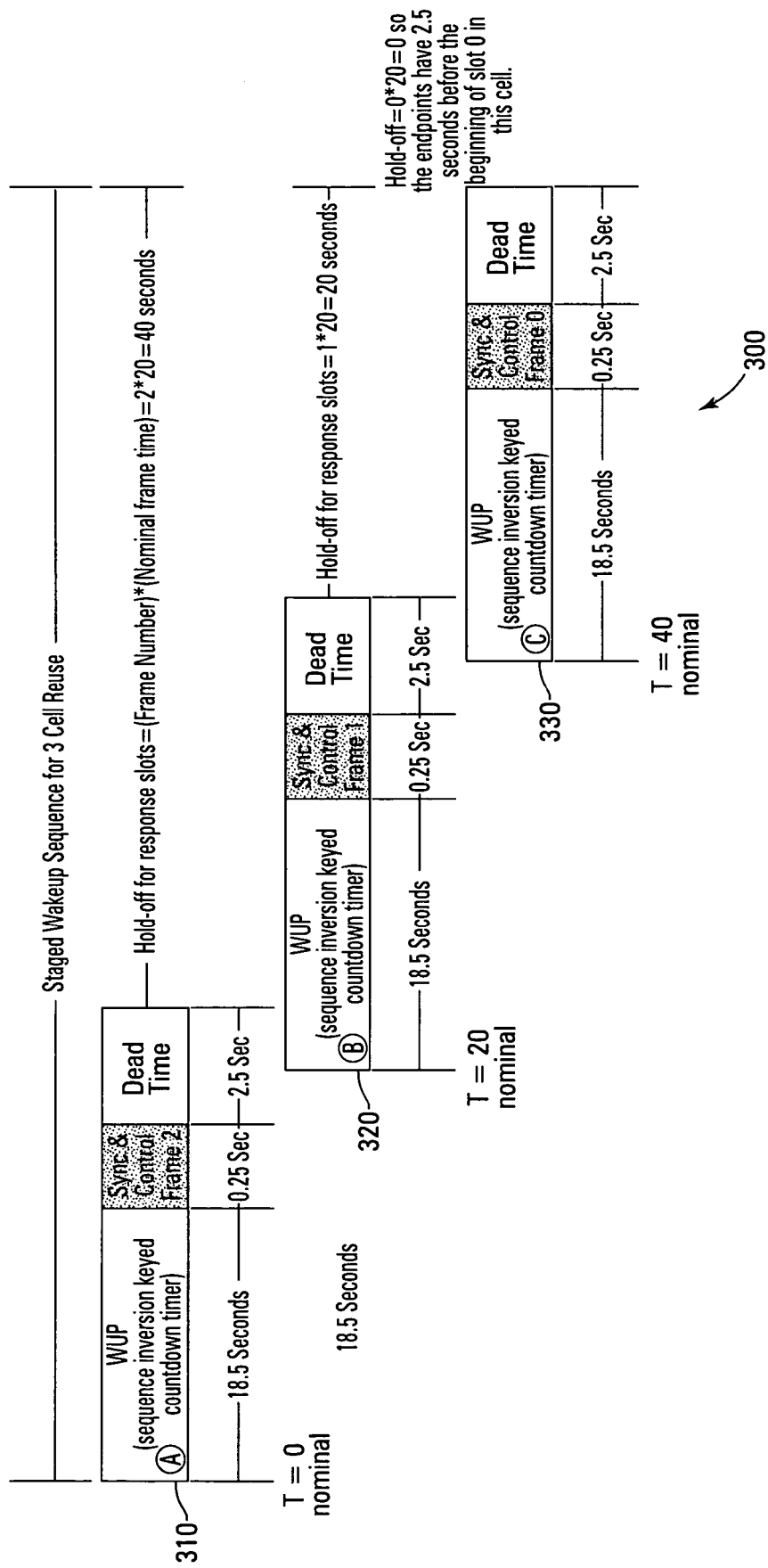
FIGS. 3A and 3B illustrates a wake-up sequence for a three-cell frequency reuse pattern of an automatic meter reading (AMR) system and communications method configured according to the present invention.
Figure 3B:
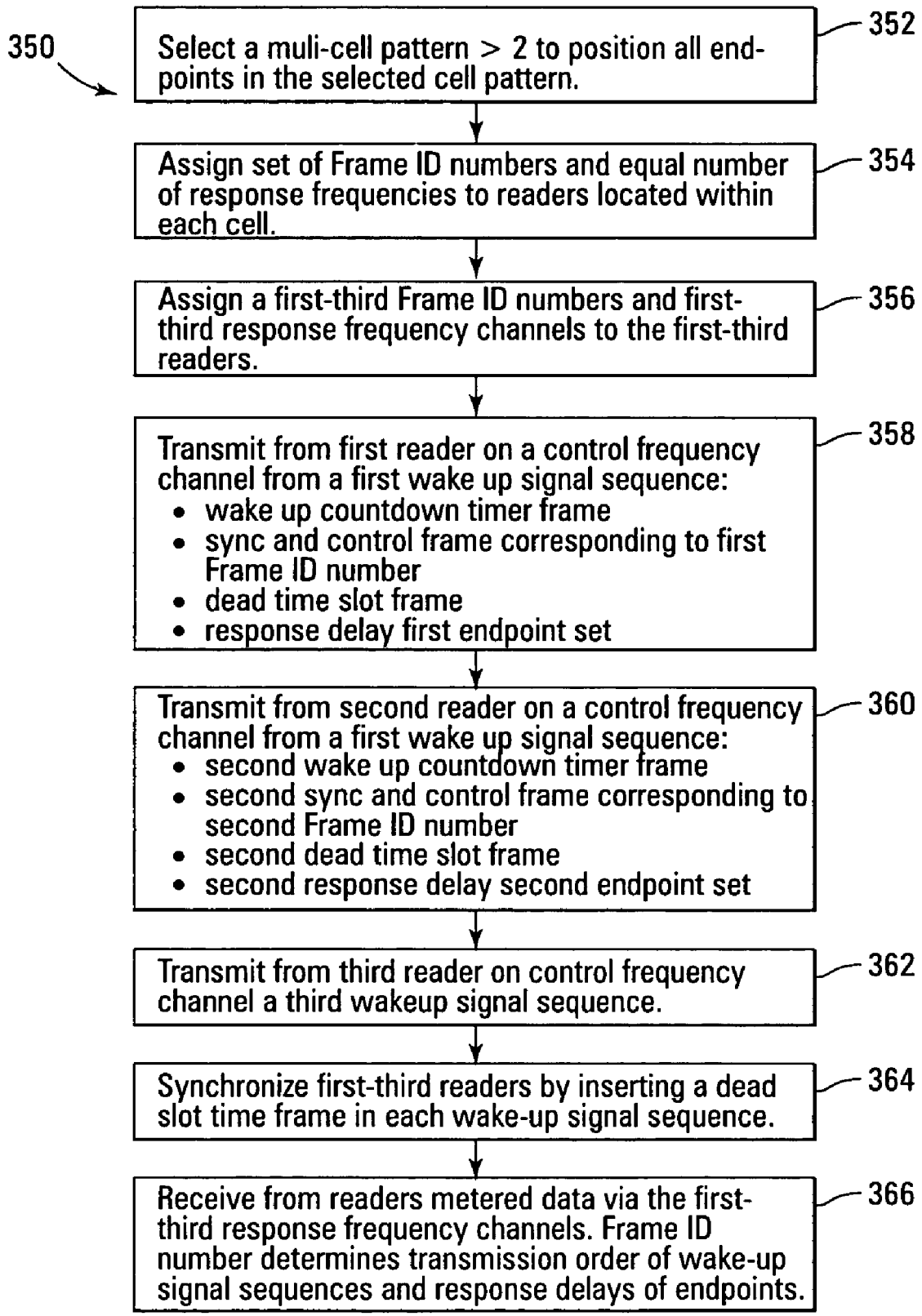

Referring now to FIGS. 3A, 3B and 4, a wake-up sequence 300 for a three-cell frequency reuse pattern 400 is illustrated, wherein the three-cell pattern is a building block of a fixed (and mobile) automatic meter reading (AMR) system configured according to the present invention. In this example embodiment, cell pattern 400 is comprised of a cell 402, a cell 404 and a cell 406. Cell 402 includes a receiver R1 configured to receive inbound data from the endpoints on channel 1. Cell 404 includes a receiver R2 configured to receive inbound data from the endpoints on channel 2. Cell 406 includes a receiver R4 configured to receive inbound data from the endpoints on channel 4. In this example, readers R1, R2 and R4 all transmit wake-up signals to the endpoints within their cells on control channel 3. Since the reader has good selectivity the endpoints can respond on a different channel in each cell simultaneously allowing maximum data throughput in the system. The outbound transmissions to the endpoints from each of the readers include instructions as to which frequency/channel that the endpoints should respond in. Therefore, in this example embodiment, R1 of cell 402 expects to receive data from its corresponding endpoints via channel 1. R2 of cell 404 expects to receive data from its corresponding endpoints via channel 2, while R4 of cell 406 expects to receive data from its corresponding endpoints via channel 4. Generally, this approach is adaptable to both fixed and mobile networks.

Referring now more particularly to fixed networks, a frame-timing scheme is utilized to optimize frequency reuse in the cell pattern. To alleviate cell-to-cell interference in an AMR system with a single control channel (such as control channel 3) readers R1, R2 and R4 must be synchronized in time so that the control frames do not overlap. In this example, receiver R1 generates a wake-up signal sequence 310, which is followed by wake-up signal sequence 320 generated by R2, and which is also followed by wake-up sequence 330 generated by receiver R4. Each wake up signal sequence is comprised of a wake-up (WUP) countdown timer, followed by a Sync and Control Frame, which is then followed by a "dead time" slot. In this example embodiment, the WUP slot has a duration of 18.5 seconds, followed by the sync/control frame having a duration of about 0.25 seconds, which is followed by a dead time slot of about 2.5 seconds in duration. The addition of a "dead time" slot in between sequential control frames allows for receivers R1, R2 and R4 to be quasi-synchronized instead of in perfect lock step with each other. Quasi-synchronizing the receivers corresponds to the clocks of receivers R1, R2 and R4 being within 0.5 seconds of each other. Such quasi-synchronization is achieved via protocols such as NTP and does not require a GPS or other high accuracy time base in the readers.

Referring now to FIG. 3B, a method of reducing signal interference in the transmission of metered data from a plurality of meter endpoint transmitters to a plurality of corresponding readers in an automatic meter reading (AMR) system is described in flowchart 350. The AMR system includes a first set of the endpoint transmitters being assigned to a first reader, a second set of the endpoint transmitters being assigned to a second reader, and a third set of the endpoint transmitters (endpoints) being assigned to a third reader. The first, second and third sets of endpoints are disposed within each of a first, second and third cells that are adjacent to each other (see e.g., FIG. 4). In this example method, a multi-cell pattern greater than two is selected for positioning all of the endpoint sets in the selected cell pattern (see 352). At step 354, a set of Frame ID numbers and an equal number of response frequencies to be assigned to the readers located within each cell of the selected multi-cell pattern is then generated. At step 356, a first Frame ID number and first response frequency channel is assigned to the first reader, a second Frame ID number and a second response frequency channel is assigned to the second reader and a third Frame ID number and third response frequency channel is assigned to the third reader.

At step 358, the first reader transmits on a control frequency channel from a first wake up signal sequence comprised of a wake-up countdown timer frame, a sync and control frame corresponding to the first Frame ID number, and a dead time slot frame. The first wake up signal sequence includes a response delay for the first endpoint set. Similarly, at step 360, the second reader transmits on the control frequency channel from a second wake up signal sequence comprised of a second wake-up countdown timer frame, a second sync and control frame corresponding to the second Frame ID number, and a second dead time slot frame. The second wake up signal sequence includes a second response delay for the second endpoint set. In addition, at step 362, the third reader, transmits on the control frequency channel a third wake up signal sequence comprised of a third wake-up countdown timer frame, a third sync and control frame corresponding to the third Frame ID number, and a third dead time slot frame. The third wake up signal sequence includes a third response delay for the third endpoint set. Before transmitting the wake up signal sequences, step 364, the first, second and third readers are synchronized so as to alleviate cell to cell interference by inserting each of a dead slot time frame in each of the wake-up signal sequences immediately after the respective control frame.

At step 366, the readers then receive metered data simultaneously from the corresponding endpoint sets via the first, second and third response frequency channels. The order of transmitting the first, second and third wake-up signal sequences and the magnitude of the response delay for the respective endpoints is a function of the Frame ID number that is assigned each cell.

In this example embodiment, the reader with the highest Frame ID number is the first to transmit the first wake-up signal sequence and the reader with the lowest Frame ID number is the last to transmit a wake-up signal sequence, the readers transmitting in a descending order as a function of the value of the Frame ID number. In addition, the response delay for each of the endpoint sets is determined by multiplying the Frame ID number by the Nominal Frame Time such that reader with the highest Frame ID number has the longest hold off time for response by the corresponding endpoint set.

Referring again to FIGS. 3A and 3B, each reader will be assigned a frame ID to use based on its position in the wakeup sequence. The position in the wakeup sequence is directly related to the frequency reuse pattern used in a given system. In this three-cell pattern example, R1 is assigned a Frame ID of 2, R2 is assigned a Frame ID of 1 and R4 is assigned a Frame ID of 0. Sequence 310 has a hold off time for response by the endpoints of about 40 seconds, while sequence 320 has hold off time of about 20 seconds and sequence 330 has a hold off time of 2.5 seconds. Each hold off time is determined by multiplying the Frame Number by the Nominal Frame Time. Hence, for Frame ID 2 of sequence 310: 2(Frame ID number)×20 seconds (Nominal Frame Time)=40 seconds. The timings in this wake-up sequence are for receivers having a clock accuracy of +/−0.5 seconds, if the value obtainable is only +/−1 second then the dead time must be increased to 5 seconds and the nominal frame time increased to 22.5 seconds. All other timings remain the same. If GPS is available in the reader, the dead time can be reduced and the frame timing can be shortened. The minimum dead time preferred in any of these wake-up sequences is about 0.5 seconds. In an example embodiment, an RF ASIC is configured so as to reduce the communications architecture to 3 contiguous channels with the remaining two or more channels to be scattered throughout the frequency band to ease spectrum allocation needs.

With the aforementioned approach, any reduction in the interference protection to the endpoint can be addressed with another approach utilizing a completely separated channel model. In this example embodiment, the endpoint would have additional base band filtering and would be slightly more susceptible to adjacent channel interference on the control channel, especially if communication occurs in the high power portion of the band. This approach would also facilitate multiple control channels in the outbound transmissions from the readers to the endpoints in an AMR system. This approach would be particularly useful in a mobile operation where channels 2, 3 and 4 of a 5-channel block for control signals are configured as multiple outbound control channels.

Figure 5A:
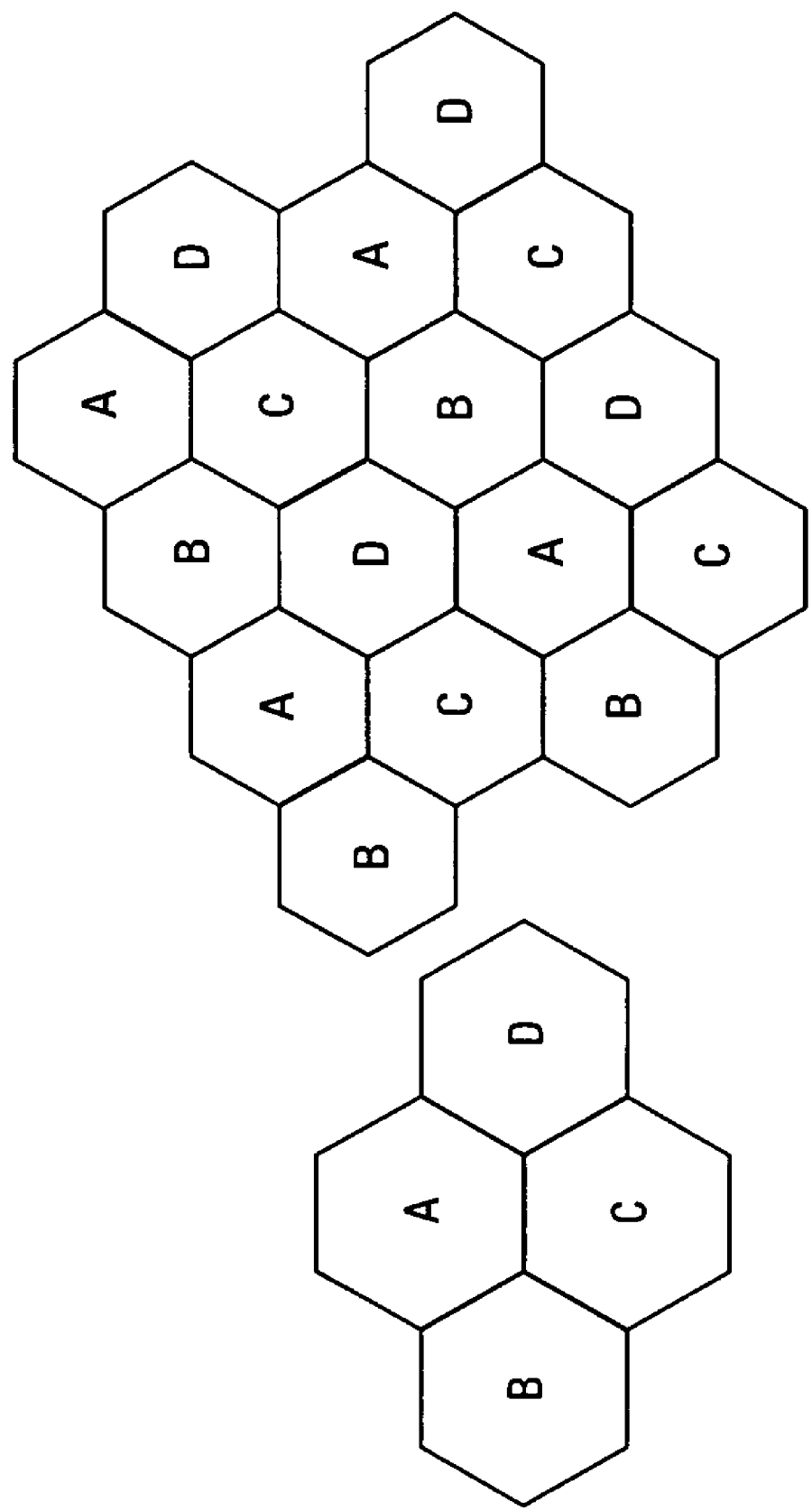

Although, most of the discussion has been for a three-cell reuse pattern, the aforementioned concept is applicable to higher cellular reuse ratios by adding more frames as appropriate. For example, FIGS. 5A and 5B illustrate a four-cell and a five-cell frequency reuse pattern, respectively, for an AMR system configured according to the invention. As illustrated in the table below, each of the cells has a receiver (R) fixed on a particular channel of the 5-channel block for control signals as well as its own Frame ID number. In the 1430 MHz system the maximum preferable cellular frequency reuse value or pattern is 5. This results in a hold off time of 100 seconds in the first cell transmitted which is short enough for the endpoint to maintain accurate timing with regard to slot timings.

Unless otherwise specified by the system, the Frame ID will be tied to the cellular frequency used based on the table below.

| Cell Reuse Ratio | Channel to Frame ID mapping |
|---|---|
| 3 Cell | Channel 1 = Frame ID 0 |
|  | Channel 3 = Frame ID 1 |
|  | Channel 5 = Frame ID 2 |
| 4 Cell | Channel 1 = Frame ID 0 |
|  | Channel 2 = Frame ID 1 |
|  | Channel 4 = Frame ID 2 |
|  | Channel 5 = Frame ID 3 |
| 5 Cell | Channel 1 = Frame ID 0 |
|  | Channel 2 = Frame ID 1 |
|  | Channel 3 = Frame ID 2 |
|  | Channel 4 = Frame ID 3 |
|  | Channel 5 = Frame ID 4 |

In a related embodiment, cellular reuse schemes having up to 7 or 9 cells in a pattern are also configurable in the 1430 MHz band; however, smaller patterns are preferred from a time delay perspective. The 7 and 9 cell patterns are likely to be used with the virtual cell model that will be described later in the specification. The software and hardware must support all three reuse ratios (i.e., 3, 4 and 5 cell patterns).

When operating in the mobile or hand held mode, the 2.5 seconds of "dead time" as described earlier for the fixed network is not applicable. Slot "0" will occur at the end of the command and control frame plus 25 milliseconds. Due to the time required to read the utility meter and or bring the charge pump to full operation the endpoint may or may not respond in slot "0" even if told to respond immediately. The hand held and endpoint should work with programming distances as close as 0.5 meter and as far as 300 meters when in the mobile mode of operation with a line of site propagation path.

In mobile operation the WUP (wake-up), C&C (command and control) data, and receive portions of a standard read cycle are continuously repeated as the mobile unit (van or hand held) moves through the AMR system. In a preferred embodiment, the frame timing is in the range of about between a 2 and a 5 second cycle.

Figure 6:
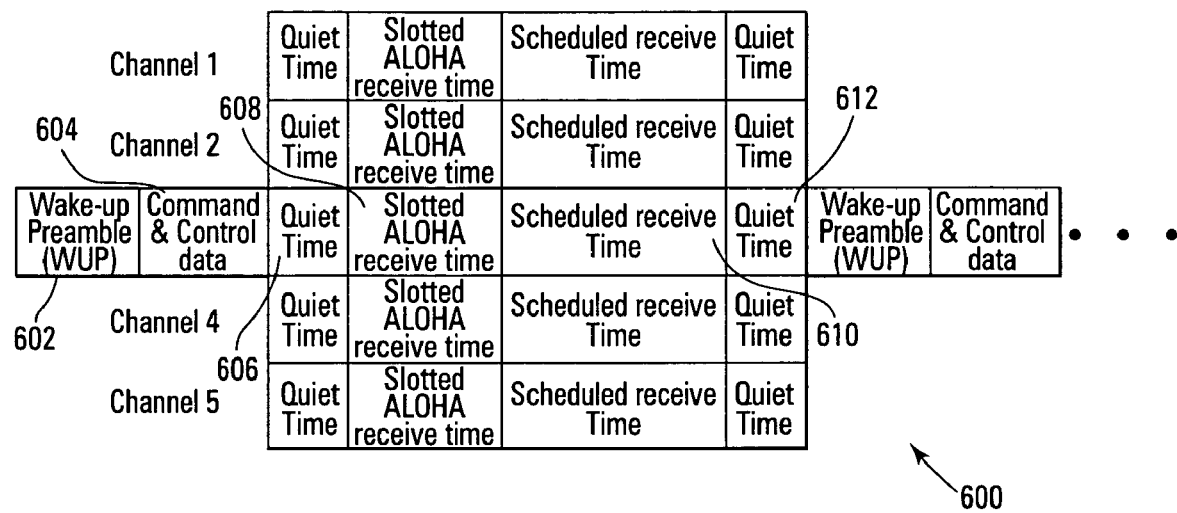
FIG. 6 illustrates a wake-up sequence for a multiple cell frequency reuse pattern of a mobile meter reading system according to the present invention.

FIG. 6 illustrates a wake-up sequence 600 for a multiple cell frequency reuse pattern of a mobile meter reading system according to the present invention. In this example embodiment, wake up sequence comprises a wake-up preamble 602, followed by a command and control frame 604, which is followed by a Quiet Time frame 606. Command and control frame 604 contains a group call read that solicits a consumptive type reading from all of the endpoints that can hear the mobile and that have the correct system Frame ID. Each endpoint is configured to respond to the group call in a random slot and on a random channel. The random channel will be chosen from the list of available channels in the command and control frame. The random slot will also be one of the 50 ms slots in an S-ALOHA portion 608 of the frame. Slotted ALOHA is a random access scheme similar to ALOHA except that the transmissions are required to begin and end within the predefined timeslot. The timeslots are marked from the end of the command and control frame just like in a fixed network. Following the slotted ALOHA frame 608 is a scheduled receive time frame 610 that precedes another quiet time frame 612 before the wake up cycle repeats itself.

Figure 7:
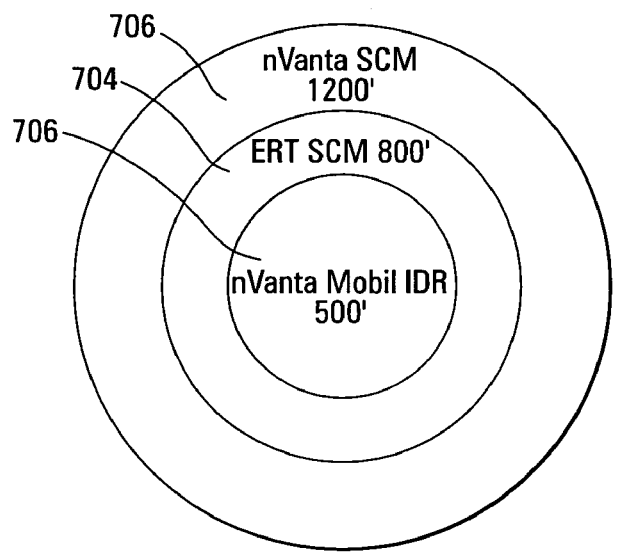
FIG. 7 illustrates data collection capabilities from the fixed and mobile systems of the present invention as compared to prior data collection methods of AMR systems.

When the mobile reader hears a response from a given endpoint it knows that it is within range, it requests a specific response from the endpoint in the next command and control frame. The command and control frame contains both a standard command frame and an extended control frame to allow for the mobile unit to access the most endpoints possible in a single pass. When the mobile unit requests a response from the endpoint, the mobile unit will provide the channel and the time slot for the endpoint's response. This minimizes the chances of a collision on the longer messages that can be delivered in the MDP (Mobile Data Packet) type of responses. During the mobile cycle, battery endpoints may be required to bubble their receivers up at a higher rate than normal or synchronize to the first command and control frame to improve mobile performance.

Where the van (mobile collector) is moving at a maximum of 30 miles per hour it will travel about 440 feet in 10 seconds. The van will also have a communication radius of approximately 500 feet given a 1430 MHz system operating at a data rate of 22.6 Kchips/second with the expected power levels and receiver sensitivities (+14 dBm endpoint TX power, −110 dBm RX sensitivity in the van, 20 dB margin, endpoint at 5 feet). The margin is included because the mobile data packet (MDP) is much longer than the current SCM (standard consumptive message) type messages and is not repeated unless an error occurs. To achieve a low re-try rate, the BER (bit error rate) is brought down to 0.01%. To reach such levels under normal situations would require an additional 20 dB of margin; however a diversity setup on the van receivers is used to achieve the same results. Two antennas are placed on the van located five to six feet apart along with an additional receiver demodulator chain per channel. For SCM data that is repeated multiple times, the system is operable at a much lower margin and still can achieve excellent read reliability in the van. A coverage radius of about 1200 feet for the system when collecting standard consumptive data is achievable. FIG. 7 illustrates a set of concentric circles or rings (rings 702-706) corresponding to coverage rings and associated data collection capabilities for the fixed and mobile systems of the present invention as compared to prior data collection methods of AMR systems.

In particular, FIG. 7 illustrates the coverage rings for low margin SCM messages (ring 704) and for the 20 dB margin IDR messages (ring 702) for the present system in comparison with the current 0 dB margin SCM messages from the ERT (Low power ISM band device). In this example embodiment, the van transmits control signals for approximately 12 to 25 seconds. This is a sufficient amount of time to wake up the endpoint, identify who it is, request a MDP (MDP=250 bytes of raw data maximum) to be sent, receive the MDP and potentially re-try the request & receive portions of the communication process if necessary.

In one example embodiment, the AMR mobile reading system has 5 channels at a maximum 75% utilization for MDP responses, thereby providing an effective data rate of 85226 BPS or 10653 bytes per second or 42 blocks per second. Since the mobile reader is detecting a single block per meter it can support 4221 new meters per second. The mobile unit will have a nominal range of 500 ft., which provides the system with about 175 metering units in range at any given time, even in the most dense of specified metering systems. If the van is moving at 30 MPH, this results in 44 ft of new meters per second. A geometric approximation results in about 12 new meters being read per second. Hence, the mobile reader in this mode can process 42 new meters per second, but data collection accuracy is the best in the range of 10 to 12 meter units per second (this allows a full set of re-tries in a dense system). This assumes the 22.727 KBPS data rate and the full 250 byte MDP, for smaller packets and with the higher data rate option system operation is even better.

Figure 8:
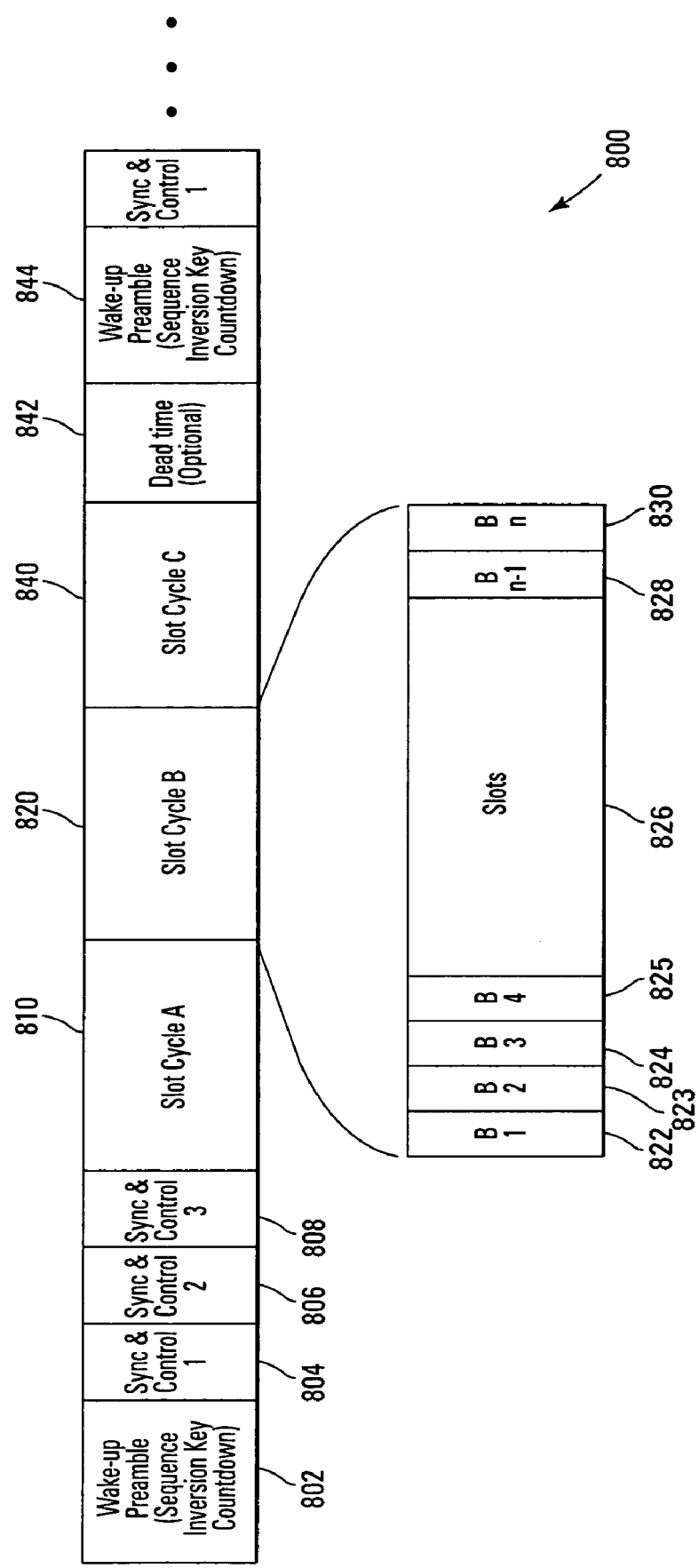
FIG. 8 illustrates another example embodiment of a wake-up sequence configured for AMR systems operating with domestic and international ISM frequency bands of about 915, 433 MHz and 868 MHz.

FIG. 8 illustrates another example embodiment of a wake-up sequence 800 configured for AMR systems operating in shared use ISM type frequency bands in the range of about 433 MHz, 868, and 915 MHz. Wake-up sequence 800 comprises a wake-up preamble 802 that is followed by three consecutively labeled Sync and Control frames 804-808, respectively. The Sync and Control frames are followed by the Slot Cycle A, B and C frames, 810, 820 and 840, respectively. An optional dead time frame 842 can be included here and then the wake-up sequence repeats itself. In this example embodiment, Slot Cycle B is further subdivided into sub-slot times 822-830, respectively. In this example, the wake-up preamble and the Slot Cycles are of 30-second durations each; with the Slot time being of 1-second duration and the Slot Cycles being of 20-minute durations each (1200 seconds=1200 slots). The Bit rate is about 20 KBPS (kilo bits per second), while the data length is about 200 Bits for a Single meter (3×data readings)=20 ms TX time or about 400 Bits for a Quad Meter (3×readings)=40 ms TX time. In one hour, each endpoint has about 3 chances to transmit its data to the reader. The data packet contains the current reading as well as those from the two previous hours. This provides 9 chances to obtain the data over a 3-hour sliding window.

The control logic used is the same as the full slotted two-way system used in a licensed band. The only difference is that the sync and control information is repeated "N" times and the endpoint is assigned "N" timeslots in which to respond (Default for N=3). In high-density systems, multiple endpoints can be assigned to each time slot if the endpoints have non-persistent CSMA collision control built in. This provides for longer slot times thereby relaxing the timing requirements in the endpoint. Each slot can be assigned "X" endpoints according to the following formula:

$$X=0.45*(Slot\ Length)/(TX\ time)$$

The 0.45 is a good design target but can be increased to 0.75 for very dense systems.

Although this range is primarily designed for international meter reading systems, this approach utilizes a scanning approach wherein the endpoint listens on each frequency in its assigned channel (or operating frequencies) list looking for a proper pseudo-random number (PN) wakeup. When this is found the endpoint will note this and continue scanning. The endpoint will respond on the channel with the best RSSI (Return Signal Strength Indication) or the fewest errors. Unless the endpoint has not heard a wake-up within a predefined number of days, the endpoint may reduce the size of the assigned channel list that is supposed to be scanned during normal operation by only checking the three most active channels.

In a related embodiment, a method to eliminate non-adjacent physical cell interference due to a less than optimal physical topology is described. The method outlined herein facilitates configuration of a two-way AMR communications network such that no two physical cells that are assigned the same receive frequency, or Cell ID, will interfere with each other's endpoint population.

The proposed method addresses the situation of two readers using the same default receive frequency where they may have the same Frame ID. In performing a read cycle on the AMR network, all cells with the same Frame ID are required to transmit a WUP (wake-up) signal on the networks control frequency at the same instant in time. The problem arises when a particular cell is situated such that it cannot be assigned a Frame ID without interfering with other cells with the same ID. All cells transmit their WUPs during a specific offset from the beginning of a read cycle based upon their Frame ID. This is done to keep adjacent cells from interfering with each other. In one example, two cells are identified as cell A and cell A' with the same Frame ID and with an endpoint that can receive the WUP of both cell A and cell A' with approximately the same signal strength. The endpoint in each cell may have difficulty in decoding the WUP signal of either the reader in cell A or cell A' if both cells transmit simultaneously. In this example, the endpoint may end up not responding to either reader. To address this situation, a method of facilitating cell virtualization is presented herein that is rather simple in its implementation, is cost effective in its deployment and helps to reduce the incidence of signal interference in the transmission of metered data from multiple meter endpoints and cells in an automatic meter reading system.

In this example embodiment, the method of reducing signal interference in the transmission of metered data from a plurality of meter endpoint transmitters to a plurality of corresponding readers in an automatic meter reading (AMR) system includes assigning a first Frame ID number and first response frequency channel to the first reader, a second Frame ID number and a second response frequency channel to the second reader, and a third Frame ID number and third response frequency channel to the third reader. Next, a wake up signal sequence comprised of a wake-up countdown timer frame, a sync and control frame corresponding to a Frame ID number, and a dead time slot frame for each reader is transmitted on at least one control frequency channel from each of the respective readers, with each of the wake up signal sequences adapted to include a response delay for the each of the endpoint sets.

The method further includes receiving metered data simultaneously at the readers from the corresponding endpoint sets via the first, second and third response frequency channels and thereafter assigning a new Frame ID number to the reader in a fourth cell upon detecting an interference of the received meter data between the fourth cell and one of the first, second and third cells, wherein the new Frame ID number corresponds to a fourth response frequency having a predefined response delay. The order of transmitting the first, second and third wake-up signal sequences and the magnitude of the response delay for the respective endpoints is a function of the Frame ID number that is assigned to the reader of each cell.

In one example embodiment of cell virtualization, the command and control frame contains both the Frame ID number of the endpoints to whom the command is issued and the frequency at which the endpoint is to send its response. The Frame ID number and response frequency are disjoint and therefore do not necessarily have to have a one to one correspondence. By re-using the response frequencies we can increase the number of Frame IDs allowing for a larger reuse pattern. The following table is an example of an AMR system having six cells but using only three response frequencies:

| Frame ID | Frequency |
|----------|-----------|
| 1 | 1 |
| 2 | 2 |
| 3 | 3 |
| 4 | 1 |
| 5 | 2 |
| 6 | 3 |

Using this method, the number of Frame IDs is not restricted to a corresponding number of response frequencies. If two cells with the same Frame ID are found to interfere with each others endpoint population, one of the cells is assigned a new Frame ID which is not currently being used on the network. Since a reader's WUP transmit offset is based on its Frame ID, an offending reader will now be transmitting in its own time slot thus eliminating the interference. The challenge with this scenario is that since the endpoint uses the Frame ID to schedule its inbound response time offset some endpoints may have to wait more time before they can respond if they are in Frame ID 6, for example. With this approach a check of the system is necessary to ensure that the AMR system can accept the latency as described above. Another alternative is to have the endpoint modify the Frame ID to a mod 3 or a mod 5 based on the maximum number of cells in the system to respond sooner.

In a related embodiment, where the number of cells exceeds the number of response frequencies in the AMR system, the step of assigning a new Frame ID number includes assigning to the new Frame ID number a previously assigned response frequency that further includes a higher offset value than that of the previously assigned response frequency corresponding to a previously assigned Frame ID number, thereby avoiding signal collision. In a related embodiment, the step of assigning a new Frame ID number includes assigning a fourth response frequency that corresponds to an unused response frequency available in the AMR system.

In a more specific embodiment, when the number of cells in the cellular re-use pattern is greater than the number of unique RF channels or response frequencies available, such as when there are 7 cells with only 5 channels, this requires that we re-use two channels at a later point in time since they can not all respond simultaneously. To implement this additional channel re-use approach, a higher offset value is assigned to the additional cells (cell virtualization) so as to enable the additional cells to respond after the initial set of cells have responded, but simultaneously with each other to maximize capacity. In this example embodiment, the endpoints will recognize any Frame ID greater than a number X and less than or equal to 2x to be in the second grouping, or third grouping if the Frame ID is over 2xbut less than 3x and so on. The default for X is 5. The example that follows illustrates an example of the responses received after the normal wakeup signal is detected. Note that although the response frequency may be the same for some of the cells the response time is different or offset to ensure there is no interference or collision in the response signal.

Normal Wakeup:+
Responses:
[Cell 1 Freq 1 Response Time 1] [Cell 6 Freq 1 Response Time 2]
[Cell 2 Freq 2 Response Time 1] [Cell 7 Freq 2 Response Time 2]
[Cell 3 Freq 3 Response Time 1]
[Cell 4 Freq 4 Response Time 1]
[Cell 5 Freq 5 Response Time 1]

In another related embodiment, the endpoints in the additional cells are programmed to respond to certain Frame IDs that may be assigned to certain cells to form predefined cell groupings that respond at the same time but on different frequencies (see for example Cells 6 and 7).

A factor to consider in implementing these approaches, especially if its for a population of battery powered devices, is that for every new Frame ID that is created, the time to complete a full network read cycle can increase by up to twenty seconds. For electric meters, which are queried most often, the WUP will only need to be about 2 seconds in duration. Generally, the extra time of battery utilization is quite short and the present approach reduces falsing and battery drain in the battery products if they are in the same network, which is an acceptable tradeoff.

The various embodiments of the invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

We claim:

1. A method of reducing signal interference in the transmission of metered data from a plurality of meter endpoint transmitters to a plurality of corresponding readers in an automatic meter reading (AMR) system, a first set of the endpoint transmitters being assigned to a first reader, a second set of the endpoint transmitters being assigned to a second reader, and a third set of the endpoint transmitters (endpoints) being assigned to a third reader, wherein the first, second and third set of endpoints are disposed within a plurality of cells, wherein each of a first, second and third cell that are adjacent to each other, the method comprising:

assigning a first Frame ID number and first response frequency channel to the first reader, a second Frame ID number and a second response frequency channel to the second reader, and a third Frame ID number and third response frequency channel to the third reader;

transmitting on at least one control frequency channel from the first reader a first wake up signal sequence comprised of a wake-up countdown timer frame, a sync and control frame corresponding to the first Frame ID number, and a dead time slot frame, the first wake up signal sequence adapted to include a response delay for the first endpoint set;

transmitting on the at least one control frequency channel from the second reader a second wake up signal sequence comprised of a second wake-up countdown timer frame, a second sync and control frame corresponding to the second Frame ID number, and a second dead time slot frame, the second wake up signal sequence adapted to include a second response delay for the second endpoint set;

transmitting on the at least one control frequency channel from the third reader a third wake up signal sequence comprised of a third wake-up countdown timer frame, a third sync and control frame corresponding to the third Frame ID number, and a third dead time slot frame, the third wake up signal sequence adapted to include a third response delay for the third endpoint set; and receiving metered data simultaneously at the readers from the corresponding endpoint sets via the first, second and third response frequency channels, wherein the order of transmitting the first, second and third wake-up signal sequences and the magnitude of the response delay for the respective endpoints is a function of the Frame ID number that is assigned the reader of each cell.

2. The method of claim 1, wherein the reader with the highest Frame ID number is the first to transmit the first wake-up signal sequence and the reader with the lowest Frame ID number is the last to transmit a wake-up signal sequence, the readers transmitting in a descending order as a function of the value of the Frame ID number.

3. The method of claim 1, before the step of assigning the Frame ID numbers to the readers, further comprising the steps of:

selecting a multi-cell pattern greater than two for positioning all of the endpoint sets in the selected cell pattern; and generating a set of Frame ID numbers and an equal number of response frequencies to be assigned to the readers located within each cell of the selected multi-cell pattern.

4. The method of claim 1, before the step of transmitting the wake-up signal sequences on the at least one control frequency, further comprising the step of synchronizing the first, second and third readers so as to alleviate cell to cell interference by inserting each of respective the dead slot time frames in each of the wake-up signal sequences immediately after the respective control frame.

5. A method of claim 1, wherein the response delay for each of the endpoint sets is determined by multiplying the Frame ID number by the Nominal Frame Time such that reader with the highest Frame ID number has the longest hold off time for response by the corresponding endpoint set.

6. A system for reducing signal interference in the transmission of metered data from a plurality of meter endpoint transmitters to a plurality of corresponding readers in an automatic meter reading (AMR) system, the system including a first set of the endpoint transmitters being assigned to a first reader, a second set of the endpoint transmitters being assigned to a second reader, and a third set of the endpoint transmitters (endpoints) being assigned to a third reader, wherein the first, second and third set of endpoints are disposed within a plurality of cells, wherein each of a first, second and third cell that are adjacent to each other, the system comprising:

a first reader with an assigned first Frame ID number and first response frequency channel adapted to transmit on at least one control frequency channel a first wake up signal sequence comprised of a wake-up countdown timer frame, a sync and control frame corresponding to the first Frame ID number and a dead time slot frame, the first wake up signal sequence adapted to include a response delay for the first endpoint set;

a second reader with an assigned second Frame ID number and a second response frequency channel adapted to transmit on the at least one control frequency channel a second wake up signal sequence comprised of a second wake-up countdown timer frame, a second sync and control frame corresponding to the second Frame ID number, and a second dead time slot frame, the second wake up signal sequence adapted to include a second response delay for the second endpoint set;

third Frame ID number and third response frequency channel to the third reader, transmitting on the at least one control frequency channel from the third reader a third wake up signal sequence comprised of a third wake-up countdown timer frame, a third sync and control frame corresponding to the third Frame ID number, and a third dead time slot frame, the third wake up signal sequence adapted to include a third response delay for the third endpoint set; and wherein the readers receive metered data simultaneously from the corresponding endpoint sets via the first, second and third response frequency channels, and wherein the order of transmitting the first, second and third wake-up signal sequences and the magnitude of the response delay for the respective endpoints is a function of the Frame ID number that is assigned the reader of each cell.

7. The system of claim 6, wherein the set of Frame ID numbers and an equal number of response frequencies assigned to the readers are generated as the endpoint sets are positioned in a selected cell pattern.

8. The system of claim 6, wherein the first, second and third readers are synchronized so as to alleviate cell to cell interference upon inserting each of respective the dead slot time frames in each of the wake-up signal sequences immediately after the respective control frame.

9. The system of claim 6, wherein the response delay for each of the endpoint sets is determined by multiplying the Frame ID number by the Nominal Frame Time such that reader with the highest Frame ID number has the longest hold off time for response by the corresponding endpoint set.

10. An automatic meter reading (AMR) system configured to transmit metered data gathered by a plurality of endpoint transmitters (endpoints) to a utility via a plurality of predefined readers disposed in a plurality of cells without a substantial loss of data caused by signal interference, the AMR system comprising:

a first set of endpoints assigned to a first reader located within a first cell of a defined communications cell pattern, the first reader having assigned thereto a first Frame ID number and first response frequency channel;

a second set of endpoints assigned to a second reader located within a second cell of the cell pattern, the second reader having assigned thereto a second Frame ID number and a second response frequency channel; and a third set of endpoints assigned to a third reader located within a third cell of the cell pattern, wherein the first, second and third cell are disposed adjacent one another, the third reader having assigned thereto a third Frame ID number and third response frequency channel;

wherein the first reader is configured to transmit a first wake up signal sequence on at least one control frequency channel to the first set of endpoints, the second reader is configured to transmit a second wake up signal sequence on the at least one control frequency channel to the second set of endpoints, the third reader is configured to transmit a third wake up signal sequence on the at least one control frequency channel to the third set of endpoints, wherein each wake-up signal sequences is comprised of a wake-up countdown timer frame, a sync and control frame corresponding to one of the first, second or third Frame ID numbers, and a dead time slot frame, wherein the first, second and third wake-up signal sequences are transmitted in a time staggered scheme as a function of the Frame ID number and the first, second and third endpoint sets respond simultaneously to each of the readers via their assigned response frequency, the Frame ID numbers and the response frequencies being a function of a multi-cell pattern selected for organizing all of the endpoint sets.

11. A method of reducing signal interference in the transmission of metered data from a plurality of meter endpoint transmitters disposed in a plurality of cells to at least one mobile reader in an automatic meter reading (AMR) system, a first set of the endpoint transmitters disposed within a first cell, a second set of the endpoint transmitters disposed within a second cell, and a third set of the endpoint transmitters (endpoints) disposed within a third cell, wherein each of the first, second and third cells are adjacent to each other, the method comprising:

assigning a first Frame ID number to the first set of endpoints, a second Frame ID number to the second set of endpoints, and a third Frame ID number to the third set of endpoints, wherein the endpoint sets are adapted to respond to signals received on a control frequency channel from the at least one mobile reader;

transmitting from the mobile reader on the control frequency channel a wake up signal sequence comprised of a wake-up preamble, a first command and control frame, a quiet time frame and a slotted receive time frame, wherein the command and control frame includes a group call directed to endpoint sets with at least one of the Frame ID numbers from the group consisting of the first, second and third Frame ID numbers;

receiving metered data at the mobile reader from the first endpoint set via a first random response frequency channel at a first random time slot;

receiving metered data at the mobile reader from the second endpoint set via a second random response frequency channel at a second random time slot; and receiving metered data at the mobile reader from the third endpoint set via a third random response frequency channel at a third random time slot;

wherein the response frequency channel used by each of the endpoint sets is randomly selected from a list of channels in the command and control frame and the order of transmitting the metered data from each of the first, second and third endpoint sets is randomly selected from a plurality of time slots provided by the slotted receive time frame.

12. The method of claim 11, upon receiving a response from one of the set of endpoints, further comprising the step of transmitting a second command and control frame that includes a standard command frame and an extended control frame, thereby allowing the mobile reader to access the most endpoints in a single pass.

13. The method of claim 11, during the step of transmitting the wake up signal sequence from the mobile reader, further comprising the step of waking up the receivers at the endpoints at a higher rate than normal so as to improve mobile data collection.

14. The method of claim 11, during the step of transmitting the wake up signal sequence from the mobile reader, further comprising the step of synchronizing the receivers at the endpoints to the first command and control frame so as to improve mobile data collection.

15. The method of claim 12, further comprising the step of transmitting metered data to the mobile reader from a plurality of endpoints via response channels distinct from the first, second and third channels and at timeslots distinct from the first, second and third timeslots.

16. A system for reducing signal interference in the transmission of metered data from a plurality of meter endpoint transmitters disposed within adjacent cells in an automatic meter reading (AMR) system, the system comprising:
   a first set of the endpoint transmitters (endpoints) disposed within a first cell and having an assigned first Frame ID number, the first endpoint set adapted to respond to signals received on a control frequency channel that includes the first Frame ID number;
   a second set of the endpoint transmitters disposed within a second cell and having an assigned second Frame ID number, the second endpoint set adapted to respond to signals received on the control frequency channel that includes the second Frame ID number;
   a third set of the endpoint transmitters (endpoints) disposed within a third cell and having an assigned third Frame ID number, the third endpoint set adapted to respond to signals received on the control frequency channel that includes the third Frame ID number; and
   at least one mobile reader adapted to transmit on the control frequency channel a wake up signal sequence comprised of a wake-up preamble, a first command and control frame, a quiet time frame and a slotted receive time frame, the command and control frame including a group call directed to endpoint sets with at least one of the Frame ID numbers from the group consisting of the first, second and third Frame ID numbers;
   wherein the response frequency channel used by each of the endpoint sets is randomly selected from a list of channels in the command and control frame and the order of transmitting the metered data from each of the first, second and third endpoint sets is randomly selected from a plurality of time slots provided by the slotted receive time frame.

17. The system of claim 16, wherein the at least one mobile reader is adapted to receive metered data from the first endpoint set via a first random response frequency channel at a first random time slot, metered data from the second endpoint set via a second random response frequency channel at a second random time slot, and metered data from the third endpoint set via a third random response frequency channel at a third random time slot.

18. The system of claim 17, wherein the mobile reader is adapted to transmit a second command and control frame, which includes a standard command frame and an extended control frame, thereby allowing the mobile reader to access the most endpoints in a single pass, upon receiving a response from one of the set of endpoints.

19. The system of claim 16, wherein the receivers at the endpoints bubble up at a higher rate than normal so as to improve mobile data collection at the mobile reader.

20. The system of claim 16, wherein the receivers at the endpoints are synchronized to the first command and control frame so as to improve mobile data collection at the mobile reader.

21. A method of reducing signal interference in the transmission of metered data from a plurality of meter endpoint transmitters (endpoints) to a plurality of corresponding readers disposed in a plurality of cells in an automatic meter reading (AMR) system, various sets of the endpoint transmitters disposed within distinct cells that are adjacent to each other, the method comprising:
   assigning a list of operating frequencies and timeslots to a first set of endpoints, wherein each timeslot has a slot length;
   transmitting on a control frequency channel from a first reader a first wake up signal sequence comprised of a wake-up preamble frame, at least one sync and control frame and a plurality of assigned slot times, wherein each of the assigned slot times is assigned at least one endpoint;
   scanning the list of operating frequencies at the first endpoint set until establishing a match with the control frequency channel and the wake-up preamble; and
   transmitting the metered data from the first endpoint set during one of the assigned timeslots via one of the assigned operating frequencies, wherein each transmission has a transmit time of TX time;
   wherein each timeslot is assigned an X number of endpoints according to the following formula: $X = 0.45 *^{(Slot\ Length)/(TX\ time)}$.

22. The method of claim 21, wherein the factor in the formula is increased to 0.75 for dense endpoint systems.

23. The method of claim 21, before the step of scanning, further comprising the step of transmitting multiple times the sync and control frame and information.

24. The method of claim 21, before the step of transmitting the metered data, further comprising the step of selecting one of the assigned frequencies with the highest return signal strength indication (RSSI).

25. A system for reducing signal interference in the transmission of metered data from a plurality of meter endpoint transmitters (endpoints) to a plurality of corresponding readers disposed in a plurality of cells in an automatic meter reading (AMR) system, various sets of the endpoint transmitters disposed within distinct cells that are adjacent to each other, the system comprising:
   a first set of endpoints with an assigned list of operating frequencies and timeslots, wherein each timeslot has a slot length; and
   a first reader adapted to transmit on a control frequency channel a first wake up signal sequence comprised of a wake-up preamble frame, at least one sync and control frame and a plurality of assigned slot times, wherein each of the assigned slot times is assigned at least one endpoint;
   wherein the first endpoint set is adapted to scan the list of operating frequencies until establishing a match with the control frequency channel and the wake-up preamble and thereafter transmit the metered data during one of the assigned timeslots via one of the assigned operating frequencies; wherein each transmission has a transmit time of TX time, each timeslot being assigned an X number of endpoints according to the following formula: $X = 0.45 *^{(Slot\ Length)/(TX\ time)}$.

26. A method of reducing signal interference in the transmission of metered data from a plurality of meter endpoint transmitters to a plurality of corresponding readers in an automatic meter reading (AMR) system among a plurality of cells, wherein a first set of the endpoint transmitters is assigned to a first reader, a second set of the endpoint transmitters is assigned to a second reader, and a third set of the endpoint transmitters (endpoints) is assigned to a third reader, wherein the first, second and third set of endpoints are disposed within each of a first, second and third cell that are adjacent to each other, the method comprising:
   assigning a first Frame ID number and first response frequency channel to the first reader, a second Frame ID number and a second response frequency channel to the second reader, and a third Frame ID number and third response frequency channel to the third reader;

transmitting on at least one control frequency channel from the first reader a first wake up signal sequence comprised of a wake-up countdown timer frame, a sync and control frame corresponding to the first Frame ID number, and a dead time slot frame, the first wake up signal sequence adapted to include a response delay for the first endpoint set;

transmitting on the at least one control frequency channel from the second reader a second wake up signal sequence comprised of a second wake-up countdown timer frame, a second sync and control frame corresponding to the second Frame ID number, and a second dead time slot frame, the second wake up signal sequence adapted to include a second response delay for the second endpoint set;

transmitting on the at least one control frequency channel from the third reader a third wake up signal sequence comprised of a third wake-up countdown timer frame, a third sync and control frame corresponding to the third Frame ID number, and a third dead time slot frame, the third wake up signal sequence adapted to include a third response delay for the third endpoint set;

receiving metered data simultaneously at the readers from the corresponding endpoint sets via the first, second and third response frequency channels; and assigning a new Frame ID number to the reader in a fourth cell upon detecting an interference of the received meter data between the fourth cell and one of the first, second and third cells, wherein the new Frame ID number corresponds to a fourth response frequency having a predefined response delay;

wherein the order of transmitting the first, second and third wake-up signal sequences and the magnitude of the response delay for the respective endpoints is a function of the Frame ID number that is assigned the reader of each cell.

27. The method of claim 26, where the number of cells exceeds the number of response frequencies in the AMR system, the step of assigning a new Frame ID number includes assigning to the new Frame ID number a previously assigned response frequency that further includes a higher offset value than that of the previously assigned response frequency corresponding to a previously assigned Frame ID number, thereby avoiding signal collision.

28. The method of claim 27, wherein additional cells that are added to the AMR system are configured to respond to Frame ID numbers that initiate a simultaneous response from the cells on previously assigned frequencies but at an offset time period.

29. The method of claim 26, wherein the step of assigning a new Frame ID number includes assigning the fourth response frequency that corresponds to an unused response frequency available in the AMR system.

* * * * *

UNITED STATES PATENT AND TRADEMARK OFFICE
CERTIFICATE OF CORRECTION

| | | |
|---|---|---|
| PATENT NO. | : 7,376,118 B2 | Page 1 of 1 |
| APPLICATION NO. | : 10/929862 | |
| DATED | : May 20, 2008 | |
| INVENTOR(S) | : Christopher L. Osterloh et al. | |

It is certified that error appears in the above-identified patent and that said Letters Patent is hereby corrected as shown below:

Title Page "(75) Inventors:", please insert --James Wall, Spokane, WA (U.S.)--

Signed and Sealed this

Thirteenth Day of July, 2010

David J. Kappos
*Director of the United States Patent and Trademark Office*